US008763759B2

(12) United States Patent
Viereck et al.

(10) Patent No.: US 8,763,759 B2
(45) Date of Patent: Jul. 1, 2014

(54) INDUSTRIAL TRUCK WITH LIFTING HEIGHT MEASUREMENT SYSTEM

(75) Inventors: Volker Viereck, Kühsen (DE); Tino Krüger, Halstenbek (DE)

(73) Assignee: STILL GmbH, Hamburg (DE)

( * ) Notice: Subject to any disclaimer, the term of this patent is extended or adjusted under 35 U.S.C. 154(b) by 21 days.

(21) Appl. No.: 13/554,325

(22) Filed: Jul. 20, 2012

(65) Prior Publication Data

US 2013/0182237 A1     Jul. 18, 2013

(30) Foreign Application Priority Data

Aug. 23, 2011  (DE) .................. 10 2011 110 830
Apr. 18, 2012  (DE) .................. 10 2012 103 364

(51) Int. Cl.
*B66F 9/00*       (2006.01)
*B66F 9/075*      (2006.01)
*B66F 17/00*      (2006.01)
*G01B 11/02*      (2006.01)

(52) U.S. Cl.
CPC ............. *B66F 9/0755* (2013.01); *B66F 17/003* (2013.01); *G01B 11/02* (2013.01)
USPC ............ 187/222; 187/227; 356/614; 356/625

(58) Field of Classification Search
CPC ...... B66F 9/0755; B66F 17/003; G01B 11/02
USPC .......... 356/614–625; 187/122, 282, 237, 284, 187/222, 39, 227, 234
See application file for complete search history.

(56) References Cited

U.S. PATENT DOCUMENTS

| | | | | | |
|---|---|---|---|---|---|
| 4,279,328 | A | * | 7/1981 | Ahlbom ........................ | 187/224 |
| 4,499,541 | A | * | 2/1985 | Yuki et al. ........................ | 701/50 |
| 4,692,086 | A | * | 9/1987 | Morita et al. .................. | 414/635 |
| 5,208,753 | A | * | 5/1993 | Acuff .............................. | 701/50 |
| 5,238,086 | A | * | 8/1993 | Aoki et al. ..................... | 187/223 |
| 5,749,696 | A | * | 5/1998 | Johnson ........................ | 414/635 |
| 6,269,913 | B1 | * | 8/2001 | Kollmannsberger et al. . | 187/394 |
| 6,952,488 | B2 | * | 10/2005 | Kelly et al. ................... | 382/104 |
| 7,287,625 | B1 | * | 10/2007 | Harris .......................... | 187/282 |
| 8,220,169 | B2 | * | 7/2012 | Goddard ........................ | 33/286 |
| 2002/0089668 | A1 | * | 7/2002 | Kokura ........................ | 356/399 |
| 2008/0011554 | A1 | * | 1/2008 | Broesel et al. ................ | 187/224 |

FOREIGN PATENT DOCUMENTS

| | | | |
|---|---|---|---|
| DE | 102008020170 | A1 | 11/2009 |
| EP | 1834922 | A2 * | 9/2007 |
| EP | 1886966 | A2 | 2/2008 |
| GB | 1470401 | | 4/1977 |
| GB | 2459349 | A | 10/2009 |
| WO | 9219526 | A1 | 11/1992 |

* cited by examiner

Primary Examiner — Sang Nguyen
(74) Attorney, Agent, or Firm — The Webb Law Firm

(57) ABSTRACT

An industrial truck has a lifting mast and vertically movable load handling device located on the lifting mast. The lifting mast has a lifting height measurement system having a light emitter that emits a light beam, a receiving element, an optical alignment element, a target element, and a measurement path located between them, the length of which measurements path varies with the lifting height. The alignment element and/or the light emitter has a beam-forming optical system, in particular a beam-expanding optical system, so that at the maximum lifting height the reflecting target is inside the expanded light beam of the light emitter in all positions of the allowable maximum bending of the lifting mast.

26 Claims, 5 Drawing Sheets

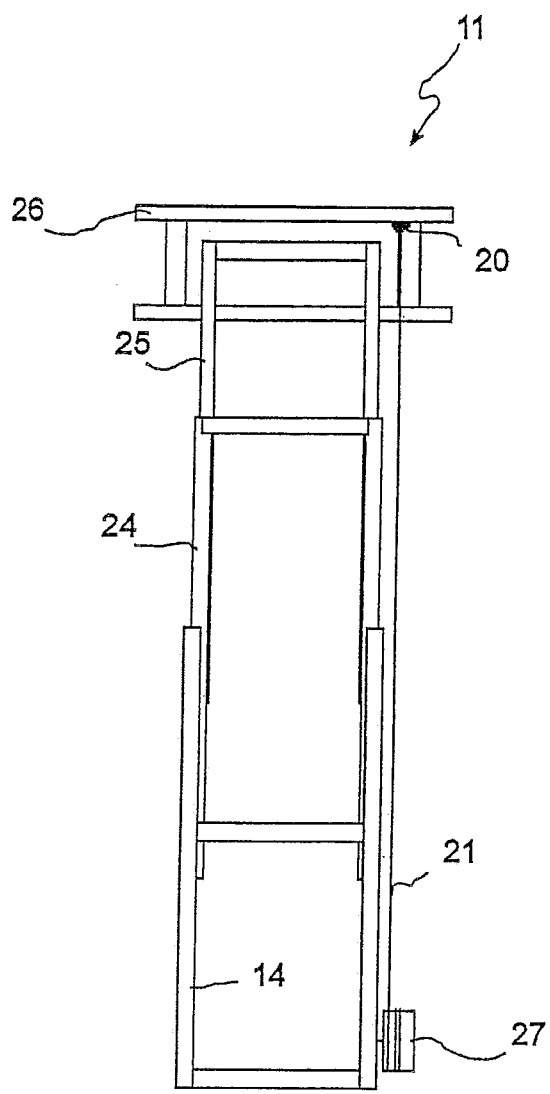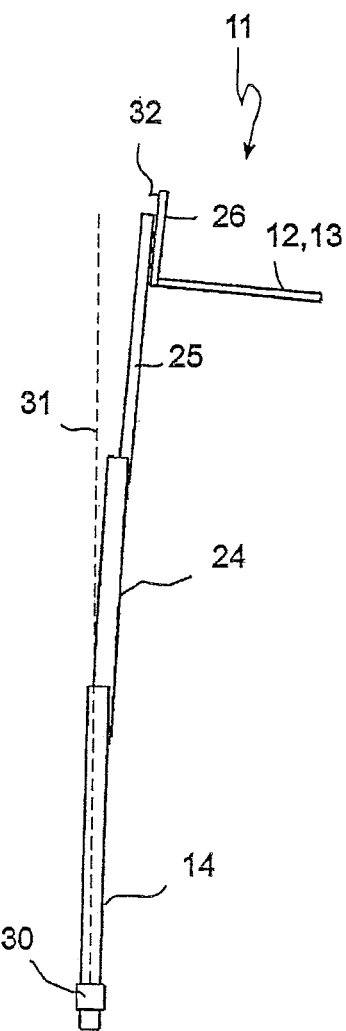
Fig. 4
(PRIOR ART)
Fig. 5
(PRIOR ART)

INDUSTRIAL TRUCK WITH LIFTING HEIGHT MEASUREMENT SYSTEM

CROSS-REFERENCE TO RELATED APPLICATION

This application claims priority to German Applications DE 102011110830.4, filed Aug. 23, 2011 and DE 102012103364.1, filed Apr. 18, 2012, both of which applications are herein incorporated by reference in their entireties.

BACKGROUND OF THE INVENTION

1. Field of the Invention

This invention relates to an industrial truck with a lifting height measurement system and a method for measuring lifting height on an industrial truck of this type. The invention relates in particular to an industrial truck with a lifting mast and vertically adjustable load handling means located on the lifting mast, wherein the lifting mast has a lifting height measurement system having of a light emitter that emits a light beam, a receiving element, an optical alignment element, a target element, and a measurement path located between them, the length of which measurement path changes with the lifting height.

2. Technical Considerations

Various lifting height measurement systems are known on industrial trucks with a lifting mast or lifting mast on which a load handling device, most frequently a load fork, is guided in a vertically adjustable manner for the transport of the load. The measurement systems make it possible to measure the distance by which the load handling device of the industrial truck is raised. For example, cable pull sensors are used, by means of which the length of a cable paid out from a cable roller or pulley when the load handling device is lifted can be measured. Other systems use a cable to which vertical tension is applied and which is wrapped around a measuring pulley, so that this measuring pulley is moved when the load handling device is moved upwardly and is placed in rotation by the cable that is wrapped around it. Conclusions about the height of the load handling device can be drawn by measuring the rotational movement.

One problem with these solutions is that the cables used, or the belts that are sometimes used as an alternative, often break because they are subject to mechanical wear and experience material fatigue because of the alternating stresses applied to them, or they can become snagged on objects such as shelves, loads etc.

A desirable objective for a lifting height measurement system is an absolute measurement of the lifting height instead of an incremental measurement which measures a relative change in the lifting height, and the actual total lifting height must be calculated continuously. An absolute measurement prevents cumulative errors in this continuous determination of the actual lifting height.

Under these conditions, the use of a laser distance sensor is attractive because a laser distance sensor performs an absolute height measurement. Because of its small size it can be easily installed in an industrial truck in the vicinity of the lifting mast and also does not require the routing of any lines or cables through the lifting mast.

FIGS. 2-5 illustrate various prior art embodiments of lifting height measurement systems.

However, the use of a laser distance sensor to perform a measurement, such as, for example, a laser sensor located in the lower portion of the industrial truck which directs a laser beam upwardly toward a target element, such as a suitable reflective target, for example, leads to problems because the position of the target, e.g. when a load is being transported or when the industrial truck accelerates/decelerates, can change significantly when the vehicle is in motion, because such a motion is accompanied by a bending of the lifting mast, e.g. out of its vertical axis, and the target moves out of the beam path of the laser distance sensor in the direction of the longitudinal axis of the vehicle or laterally with respect to the vertical axis at a right angle to the longitudinal axis of the vehicle.

When a laser distance sensor of the known art is used, the only effective countermeasure for this problem is to make the horizontal surface of the target correspondingly large. However, this requirement cannot always be met given the limited space available in the lifting masts of industrial trucks.

An additional problem that occurs with lifting height measurement systems on industrial trucks and that must be taken into consideration is the fact that as a result of wear on the tires, the ground clearance of the vehicle decreases with time and distorts the absolute value of the lifting height, which must be determined very accurately to avoid a collision with a shelf, for example. With super-elastic tires in particular, wear leads to significant changes that can be in the vicinity of a centimeter.

EP 1 866 966 A2 describes a device for contactless measurement of the lifting height in which a transmitter device transmits a wave-form signal, in particular an electromagnetic wave, to a separately located receiver device. The transmitter and receiver devices are located on moving components that move in relation to each other during lifting movements of the lifting mast. One disadvantage of this device is that both the receiver as well as the transmitter device require signal lines and a power supply, all of which must be taken into consideration accordingly in terms of their location and arrangement in the lifting mast.

DE 10 2008 020 170 A1 describes a method for measurement of the height of vertically adjustable load handling means of an industrial truck. In this method, an image of a target that is movable relative to a receiver device is registered by the receiver device and the position of the load handling means is determined from the change of the image.

It is an object of the present invention to provide an industrial truck with a lifting height measurement system which is suitable for use on an industrial truck and can be integrated into a wide variety of lifting masts with little effort or expense.

SUMMARY OF THE INVENTION

The invention teaches that this object is accomplished by an industrial truck with a lifting mast and load handling means which are located in a vertically adjustable manner on a lifting mast. The lifting mast has a height measurement system that comprises a light emitter that emits a light beam, a receiving element, an optical alignment element, a target element, and a measurement path located between them, the length of which measurement path varies with the lifting height. The alignment element and/or the light emitter have a beam-forming optical system, in particular a beam-expanding optical system, so that at the maximum lifting height, the target element is still located inside the expanded light beam from the light emitter for all positions of allowable maximum bending of the lifting mast.

The light beam thereby advantageously covers the entire area in which the target element, e.g. in the form of the receiving element or a reflecting target, can be located, e.g. in the event of a bending or rotation of the lifting mast. In particular, even when a load handling means of the lifting mast is lifted to a significant height, an accurate measurement of the actual height can be taken because a sufficiently large signal component of the expanded light beam is detected by the target element and in the case of a reflective surface is reflected back to the receiving element. The features of this invention therefore make it possible to use light emitters that emit conventionally strong focused light, such as laser distance sensors, even on industrial trucks with very high lifting heights such as shelf pickers, fork lift trucks with lifting masts, and counterweight fork lift trucks with a high lifting mast. The largest dimension of the target element or reflecting target can be designed so that it can be installed inside the lifting mast. Light emitters with strongly focused light are generally already used only so that it is possible, at great lifting heights, to achieve a sufficient intensity of the signal reaching the target element or reflected back. In particular, the solution of the invention is also suitable for use on industrial trucks and counterweight forklift trucks that require a robust and reliable height measurement. In contrast to solutions of the known art that use cables, there is no mechanical wear, cable breakage or operational failure on account of weathering, such as ice formation in particular. The design of the invention offers a heavy duty and reliable sensor concept for the measurement of the lifting height on industrial trucks. Because the measurement is taken by means of a light beam, there is always a measurement of an absolute value for the lifting height with reference to the position of the light emitter and/or alignment element and/or of the reflective target or target element. Errors in an incremental measurement are thereby prevented. Both the target element, in particular in the form of a reflective target, as well as the receiving element and the light emitter are relatively compact assemblies and can easily be integrated into many different lifting masts. This makes possible an economical implementation of the lifting height measurement system, and additional optional equipment for the industrial truck that require a knowledge of the lifting height can also be provided. The light emitter and the receiving element can thereby all use known technologies for distance measurement such as, for example, a measurement of the elapsed time between the emission of the signal and the echo-return, a measurement of interference passages of the light itself, or a modulated frequency. The measurement path can thereby comprise all lengths of the optical path, although it can also include only portions of the path between the light emitter, alignment element, target element and receiver element, which vary accordingly when there is a change in the lifting height. In particular, the alignment element can aim the optical path at the target element and a portion of the measurement path can be located between these two components. The light emitter can thereby send the light beam to the alignment element, which can aim the light beam at the target element which can be connected with the receiving element or only direct the light beam toward the receiving element. The beam-forming optical system, which is in particular a beam-expanding optical system, can be connected with the light emitter but also with the alignment element. For example, the alignment element can include a convex mirror which results in an expansion of the beam.

In one advantageous embodiment of the invention, the light emitter is a laser with a beam-expanding optical system.

A spot-type laser distance sensor of the known art, at a lifting height of 12 m, for example, would require a reflecting target with a diameter of approximately 30 cm to always be reliably illuminated by the laser beam at the known deviation of the lifting mast from the vertical axis as a result of bending. Laser distance sensors of this type of the known art, which are available economically and are a mature technology, can be used with the solution of the invention for the measurement of the lifting height on industrial trucks.

The light emitter can be a semiconductor lighting element, in particular an LED. LEDs are particularly advantageous on account of their small and compact size. On one hand, LED's can be used as lasers and on the other hand it is possible to simultaneously incorporate an optical system on account of the plastic housing in which many models of LEDs are enclosed. LEDs that do not include a laser, also emit a relatively narrowly focused light beam. On LEDs of this type it is possible to form the expanded light beam of the invention either by means of their own optical system or an optical system molded into or onto the LED housing.

The beam-forming optical system advantageously includes a divergent lens. A separate, additional divergent lens represents a particularly economical solution. It also makes possible an accurate adaptation to the requirements of the individual lifting mast with reference to its rigidity and lifting height as well as the maximum lateral bending which determines the magnitude of the maximum expansion.

The beam-forming optical system can form a expanded light beam which is conical.

In one advantageous realization of the invention, the alignment element is simultaneously the light emitter.

Because very small and compact assemblies such as laser diodes are available, for example, they can also be installed easily, thereby making possible the alignment with the target element. If necessary, they also allow for a certain degree of adjustability of the alignment.

The target element is advantageously a reflecting target. All the components that require electrical connections or signal lines can be located on one side of the measuring path and thus, for example, on the lower part of the lifting mast.

In a measurement path, the reflecting target can be located opposite the light emitter and/or the receiving element on a part of the lifting mast that moves relative to the light emitter and/or receiving element during a lifting movement, or on the load handling means.

In one advantageous configuration of the invention, the light emitter is located in a lower position on the lifting mast or on the industrial truck, and the reflecting target is lifted with the moving part of the lifting mast or with the load handling means.

Advantageously it is therefore possible not to route any lines through the lifting mast. When the light emitter and the receiving element are located on the lower part of the lifting mast, the reflecting target is thereby either attached to the lifting carriage or to the load handling means and therefore measures the height to which the load is lifted directly. Alternatively, however, the reflecting target can be attached to any other upwardly moving part of a lifting mast, e.g. of a multi-level lifting mast, and therefore the height to which this part is lifted can be measured directly, if and to the extent necessary.

In one advantageous realization of the industrial truck of the invention, the reflecting target has optical reflecting properties, in particular a very high coefficient of reflection for the wavelengths of the light of the expanded light beam, that differ significantly from the reflecting properties of other areas of the lifting mast or of the load handling means illuminated by the expanded light beam.

As a result of a significantly higher coefficient of reflection, the reflecting target can reflect the largest signal component of the signal measured by the receiving element even if, in the position of maximum lift, it reflects only a small percentage of the area of the expanded light beam. This prevents measurement errors caused by light that is reflected by other components.

The reflection from such components can also be minimized by means of an appropriate color design, in particular by the use of dark-colored and non-glare or flat paint.

In an advantageous realization of the invention, the reflecting target is a retroreflection surface. Retroreflection surfaces are characterized in that incident light is reflected back in exactly the same direction, regardless of the angle of incidence. Examples of such devices are reflectors of the type used in photoelectric barriers and in traffic control applications. Retroreflective surfaces are available, for example, in the form of films and are used industrially, for example, in triple mirrors. Because the light of the expanded, e.g. conical, light beam is reflected back by the retroreflection surfaces in the direction from which the individual light beam originates, the reflected light is consequently again focused on the light emitter that emitted the light. If the receiving element is located immediately next to the emitting light emitter, the reflected component of the expanded light beam is also focused on the receiving element. The light emitter and the receiving element advantageously form a structural unit which can be made particularly compact, and has in particular one common optical aperture for emission of the light and for reception of the reflected component of the light.

The reflecting target can have a focusing shape. A normal mirror surface can also be used as an alternative to a retroreflective surface. This surface can also be convex with a radius, in particular a radius which is approximately equal to the maximum lifting height. The reflected component of the light is thereby also focused on the light emitter or a receiving element that is located next to it, at least in the position of the maximum lifting height.

A cleaning device (60 in FIG. 7) for the optical system and/or the receiving element is advantageously provided, in particular a cleaning device that uses sprayed water and/or compressed air and/or a wiper and/or a brush device. A cleaning device of this type makes it possible to guarantee reliable operation of the measurement system, especially in environments with a high content of dust and dirt.

In one development of the invention, the surface of the beam-forming optical system and/or of the receiving element has a lotus effect. It thereby becomes possible to advantageously prevent dirt from adhering to the components of the optical system. In particular, however, even on industrial trucks, especially counterweight forklift trucks that are operated outdoors, this feature prevents the components of the optical system from being wetted by water, and in the winter prevents the potential formation of ice.

The surface can be inclined with respect to the horizontal. Together with the lotus effect described above, water consequently always beads off and thereby also carries dust along with it. On industrial trucks that are operated outdoors, rain therefore automatically results in a cleaning of the system.

The beam-forming optical system and/or the receiving element and/or the target element are advantageously heated. It thereby becomes possible, when the temperature is below freezing, to prevent a failure of the lifting height measurement system. It thereby becomes possible to use the system reliably outdoors, including in the winter, and in refrigerated or freezer rooms.

An additional reference sensor, in particular a laser distance sensor (70 in FIG. 6), can also measure a distance to a road surface. Over time, on counterweight forklift trucks with solid rubber elastic tires, wear on the tires can lead to a significant change in the ground clearance and thus also in the corresponding absolute value of the lifting height that corresponds to a measured value. This change can be corrected by a reference sensor. It is also possible by means of any other conceivable method to measure the tire wear and to determine the change in ground clearance from a calculated change in the radius of the tires.

In one realization of the invention, an input device can be used to input a lifting height as a reference value. This input device makes it possible for an operator to input a reference value and a correction for deviations that occur over time, for example on account of tire wear.

Sensor means can also detect contact between the load handling means and the ground, and it thereby becomes possible to determine a reference value for the lifting height. If a suitable sensor determines that the load handling means, in particular a load fork, for example, are resting on the ground, that can be used as the reference value zero and the absolute lifting height can thereby easily be determined by the lifting height measurement system.

The light emitter and/or the alignment element on the lifting mast is/are advantageously mounted with an adjustable alignment. An adjustable installation on the lifting mast makes it possible to adjust the alignment of the light beam. This capability is particularly advantageous with an expanded light beam, because in this case the center of the light beam can be aimed at the reflecting target when the lifting mast is not bent, and it can be guaranteed that the target element or the reflecting target remains within the expanded light beam no matter how much the lifting mast is bent.

The object of the invention is also accomplished by a method for the measurement of the lifting height on an industrial truck as described above.

The method for the measurement of the lifting height on an industrial truck has the advantages described above.

In another realization of the invention, a plausibility check can be performed to verify the values of the lifting height by checking for unallowable values of the lifting height and/or for sudden variations in the change of the lifting height and/or for parallelism of the change in lifting height, to ensure that the lifting height control signal remains within an allowable range of values.

It thereby becomes possible to verify the signal and to detect and take into consideration any interruption of the optical link between the light emitter and reflecting target that may be caused, for example, by environmental factors such as dirt, dust, ice, etc. or a blockage caused by projecting obstacles etc. It can be assumed that the measurement is incorrect if the system indicates a change in the lifting height although no control signal is being sent to the lifting drive system, or if a change in lifting height is indicated at a rate which cannot be achieved by the lifting drive, and therefore there is an excessive gradient of the lifting movement or a discontinuous change in the lifting movement.

A plausibility check can be performed to verify the values of the lifting height by comparing specified value ranges of the intensity of the signal received in the receiving element that are a function of the lifting height, in particular of a signal reflected on a reflecting target, with the measured lifting height.

It thereby becomes possible to verify the operation and accuracy of the lifting height measurement system when the receiving element delivers information about the intensity of the measured signal. As the lifting height increases, the reflecting target reflects a relatively smaller percentage of the beam in the expanded light beam. The intensity of the signal received by the receiving element thereby decreases as the lifting height increases. Likewise, only a relatively smaller component of the beam reaches the target element. This comparison of intensity can be performed by a control computer which can be integrated into the receiving element or can also be integrated into a control computer of the industrial truck.

The minimum values of the lifting height that occur over a defined measuring period can advantageously be used as the reference value zero for the lifting height.

If the minimum values of the lifting heights that occur over a certain period are measured, these values can be assumed to be those that correspond to the placement of the load handling means on the ground and this value can be set as the reference value to zero. This can be easily implemented purely by software in a vehicle control system, for example, or any other such control computer which is available without the need for additional hardware.

In one advantageous realization of the method of the invention, the variation in intensity of the signal received in the receiving element, in particular of a signal reflected by a reflecting target, is monitored over time and if it drops below certain thresholds, a contamination of the lifting height measurement system is detected.

As the optical system of the light emitter or of an optical window of the receiving element becomes increasingly dirty, there is a gradual reduction of the signal strength.

The threshold values can be a function of the lifting height.

Because, as described above, the intensity of the signal also decreases with the lifting height, the detection of increasing contamination can therefore be conducted more accurately.

BRIEF DESCRIPTION OF THE DRAWINGS

Additional advantages and details of the invention are explained in greater detail below with reference to the exemplary embodiments illustrated in the accompanying schematic figures, in which:

FIG. 4 is a schematic illustration of an additional lifting mast of the known art in a head-on view;

FIG. 5 is a schematic illustration of an additional lifting mast of the known art, in a side view;

DETAILED DESCRIPTION OF THE INVENTION

Figure 1:
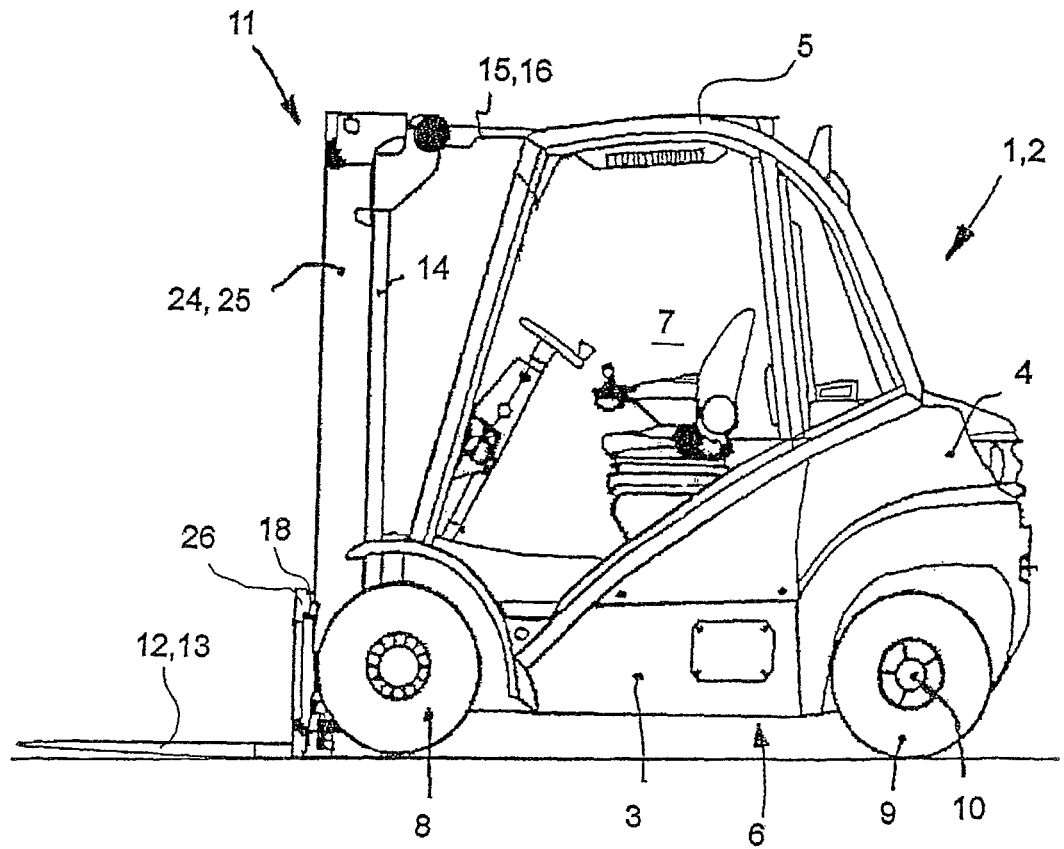
FIG. 1 shows a counterweight forklift truck of the invention in a side view.

FIG. 1 shows a side view of an industrial truck 2 of the invention, for example a counterweight fork lift truck 1, as an exemplary embodiment of an industrial truck 2. In a center segment, the counterweight fork lift truck 1 has a vehicle superstructure 6 inside the chassis formed by a frame 3, a counterweight 4 and, underneath a protective roof 5 for the driver, a driver's workplace 7.

Underneath the driver's workplace 7 there is an equipment compartment in which the components of the drive system of the fork lift truck 1 are located. When the drive system is powered by an internal combustion engine, below the driver's workplace 7 there is an internal combustion engine, along with the components of a traction drive system and a hydraulic work system that are driven by the internal combustion engine. When the drive system is powered by an electric battery, underneath the driver's workplace 7 there is a battery compartment which holds a power supply device, which can be in the form of a battery block, for example, with which the traction drive and the hydraulic work system are supplied with electrical energy.

As shown in FIG. 1, in the forward area of the counterweight fork lift truck 1 there are wheels which are in the form of drive wheels 8, and in the rear area of the truck there is a steering axle 10 that is equipped with steered wheels 9.

On the forward side of the industrial truck 2 there is a lifting mast 11 on which load handling means 13 in the form of a load fork 12 are guided so that they can be raised and lowered.

The lifting mast 11 comprises a stationary mast 14 which is formed by two vertical lifting mast profiles that are located at a distance from each other in the transverse direction of the vehicle. The stationary mast 14 is tiltable arranged on the vehicle superstructure 6 by means of a tilt drive system 15 which is formed by tilting cylinders 16.

The lifting mast 11 is in the form of a telescoping lifting mast, which has one or more telescoping masts 24, 25 that are guided in the stationary mast 14 and can be extended upwardly, in which the load handling means 13 is guided on an adjustable-height lifting carriage 26. The lifting mast 11 is located between the drive wheels 8 in the transverse direction of the vehicle.

Located on the load fork 12 or on the lifting carriage 26 is a reflecting target 18 which is illuminated by a laser sensor which is located on the stationary mast or on the industrial truck 2 and is not visible in the illustration in FIG. 1. The reflected laser light is detected by a receiving element which is connected with the laser sensor.

Figures 2, 3:
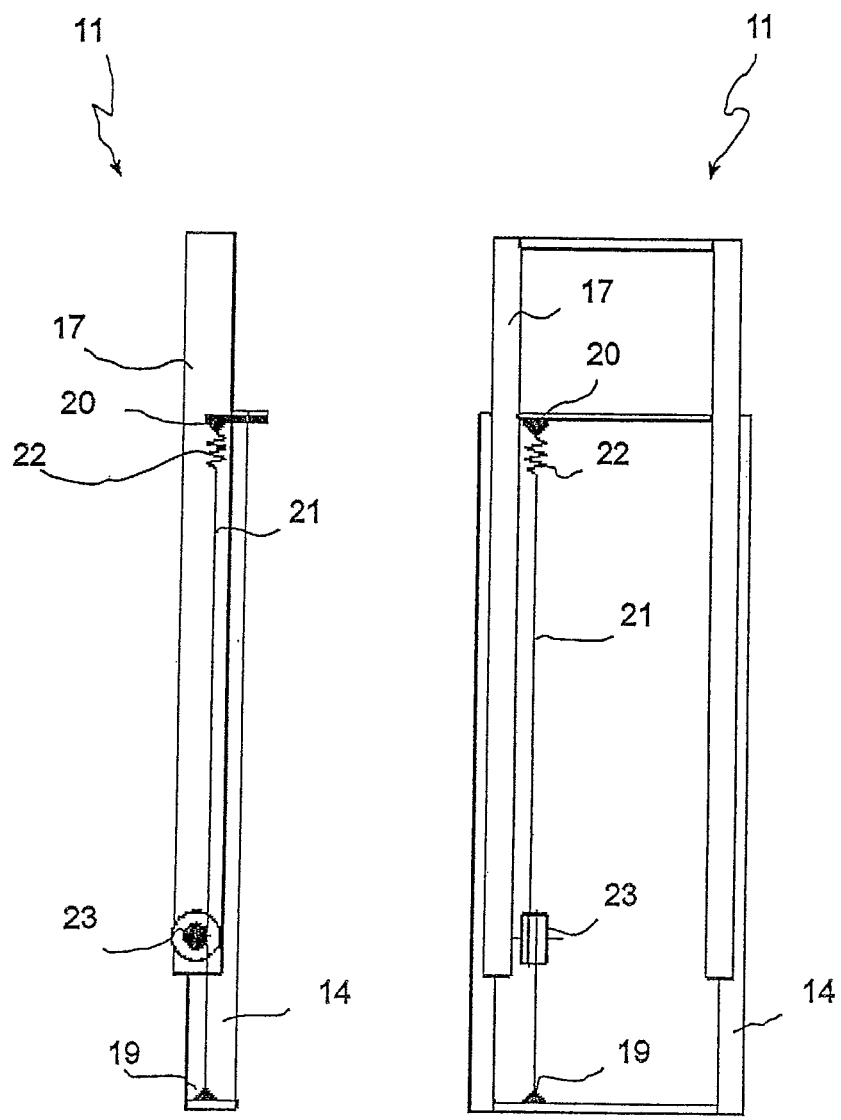
FIG. 2 is a schematic illustration of a lifting mast of the known art, in a side view.
FIG. 3 is a schematic illustration of the lifting mast illustrated in FIG. 2, in a head-on view.

FIG. 2 is a schematic illustration of a lifting mast 11 of the known art in a side view from the inside. Elements that are the same as those in FIG. 1 and the subsequent figures are each identified with the same reference numbers. The lifting mast 11 consists of a stationary mast 14 on which, in this case, a single telescoping mast 17 that can be extended upwardly is guided. A cable 21 is stretched between a lower fastening point 19 on the stationary mast 14 and an upper fastening point 20 on the stationary mast 14. The cable 21 is kept under tension by a spring 22. The cable 21 is guided by being wrapped at least once around a measurement pulley 23 which is mounted on the telescoping mast 17.

FIG. 3 is a schematic illustration of the lifting mast 11 shown in FIG. 2 in a head-on view, which is constructed from the stationary mast 14 and the telescoping mast 17 guided on it. The cable 21 stretched between the lower fastening point 19 and the upper fastening point 20 on the stationary mast 14, to which tension is applied by the spring 22, is guided by being wrapped around the measurement pulley 23.

When the telescoping mast 17 is moved upwardly with reference to the stationary mast 14, the measurement pulley 23 moves upwardly together with the telescoping mast 17 and is placed in rotation by the wrapped cable. The rotations can be used to measure the increase or decrease in the height.

In the lifting height measurement system with this lifting mast of the known art, the cable 21 can break as a result of mechanical wear and alternating stresses. Any slippage of the cable 21 can also cause measurement errors.

FIG. 4 is a schematic illustration of an additional lifting mast 11 of the known art in a head-on view. The lifting mast 11 again consists of a stationary mast 14 on which a first telescoping mast 24 and a second telescoping mast 25 are guided so that they can be extended upwardly. Fastened to an upper fastening point 20 on a lifting carriage 26 is a cable 21 which is rolled up by a take-up pulley 27 which is mounted on the stationary mast 14 and is kept under tension. When the lifting carriage 26 is moved upwardly on the stationary mast 14 it pulls the cable off the take-up pulley 27. The length of the cable 21 paid out corresponding to the lifting height can be measured by means of the rotations of the take-up pulley 27.

When the lifting height is measured on this lifting mast 11 of the known art, malfunctions can occur if the operation of the take-up pulley is adversely affected by dirt. In particular, when the industrial truck is operated outdoors in the winter, the equipment can fail or be damaged by the formation of ice, and the cable 21 can break. It also occurs relatively frequently that the cable 21 must be replaced because it has become worn.

FIG. 5 is a schematic illustration of an additional lifting mast 11 of the known art in a side view. The lifting mast 11 also has a stationary mast 14, on which a first telescoping mast 24 and a second telescoping mast 25 are guided so that they can be extended upwardly, as well as a lifting carriage 26 with a load fork 12 as the load handling means 13. Located on the stationary mast 14 is a laser sensor 30, which aims a laser beam 31 vertically upwardly to a reflecting target 32, for example a mirror or reflector, which is attached to the lifting carriage 26.

FIG. 5 illustrates the situation in which the lifting mast 11 is raised to a significant height to handle a load which is not visible in the figure, and in which, for example, the industrial truck is decelerating while taxiing. This operation results in vibrations of the lifting mast 11, in particular a lateral deflection of the upper portion of the lifting mast 11 on account of the play among the guides of the stationary mast 14 and of the first telescoping mast 24 and the second telescoping mast 25 in relation to one another. The laser beam 31 therefore no longer strikes the reflecting target 32 and the lifting height measurement fails. In particular as a result of the weight of the load, even after the vibrations have died out, the lifting mast 11 can still be bent so far and therefore be out of position in its upper area that the laser beam 31 does not strike the reflecting target 32.

Figure 6:
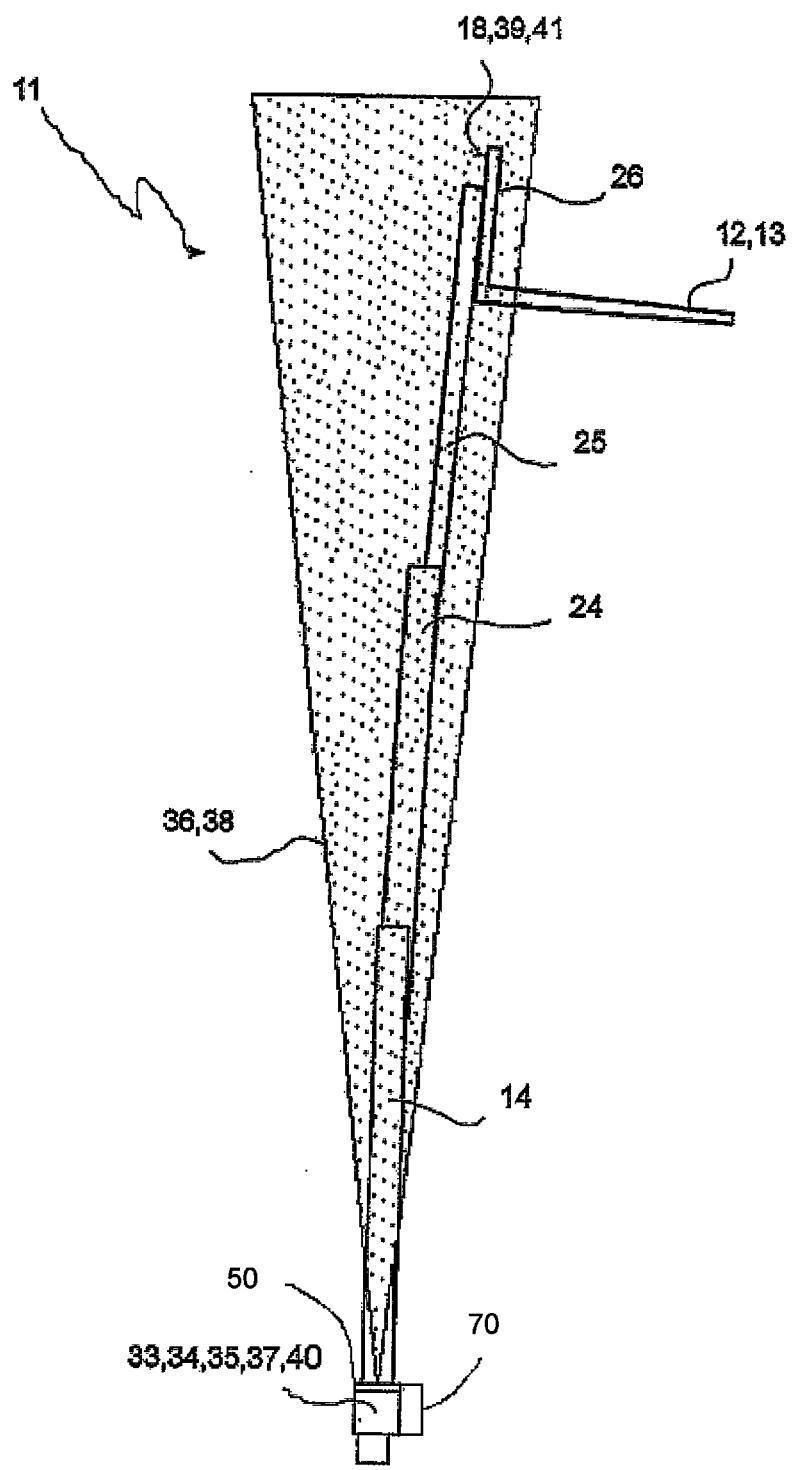
FIG. 6 is a schematic illustration of a lifting mast of the invention on the fork lift truck illustrated in FIG. 1.

FIG. 6 is a schematic illustration of the lifting mast 11 of the industrial truck 2 of the invention illustrated in FIG. 1, which can be in the form of a counterweight fork lift truck, for example.

The lifting mast 11 has a stationary mast 14 on which the first telescoping mast 24 and the second telescoping mast 25 are guided so that they can be extended upwardly, along with the lifting carriage 26 with the load fork 12 as the load handling means 13. On the stationary mast 14 there is a sensor unit 33 comprising of a laser 37 as the light emitter 34 and a receiving element 35. The laser 37 has a beam-expanding optical system comprising of a divergent lens 50 which expands the laser beam to a conical laser beam 38 in the form of an expanded light beam 36. The conical laser beam 38 is aimed vertically upwardly to a reflecting target 18 which is attached to the lifting carriage 26 and is a retroreflective surface 39 which reflects light beams in a specified angular range, regardless of the angle of incidence, to itself. The angle of beam spread of the conical laser beam 38 is selected so that the reflecting target 18 is still within the conical laser beam 38 at the maximum possible deflection of the lifting mast 11 during normal operation, for example as a result of movements during the travel of the vehicle or the load being transported when the lifting mast 11 is at its maximum height. In the exemplary embodiment illustrated in FIG. 6, the light emitter 34 is simultaneously an alignment element 40 and the reflecting target 18 also represents a target element 41.

It is thereby reliably guaranteed at all times that a lifting height measurement can be performed even if the lifting mast 11 is bent.

Figure 7:
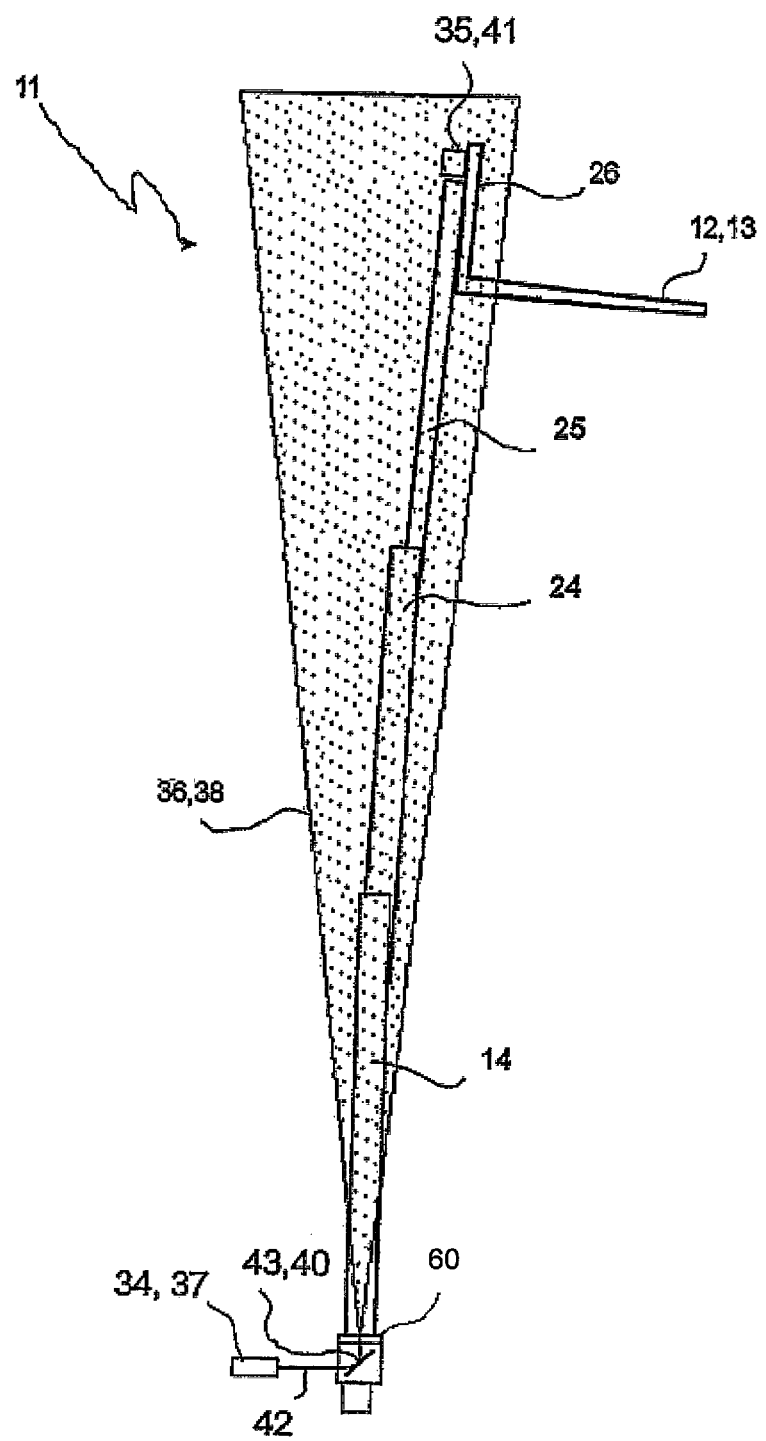
FIG. 7 is a schematic illustration of an additional exemplary embodiment of a lifting mast of the invention on a fork lift truck of the type illustrated in FIG. 1.

FIG. 7 is a schematic illustration of an additional exemplary embodiment of the lifting mast of an industrial truck 2 of the invention of the type illustrated in FIG. 1. The lifting mast 11 has the stationary mast 14 on which the first telescoping mast 24 and the second telescoping mast 25 are guided so that they can be extended upwardly, as well as the lifting carriage 26 with the load fork 12 as the load handling means 13. Located on the stationary mast 14 is a laser 37 which is the light emitter 34, which sends a laser beam 42 to a mirror 43 which is the alignment element 40. The mirror 43 can be convex, for example, and thereby forms a beam-expanding optical system which expands the laser beam into a conical laser beam 38 which acts as the expanded light beam 36. Alternatively, a beam-expanding lens can also be located between the light emitter 34 and the mirror 43. The conical laser beam 38 is aimed upwardly by the alignment element 40 toward the receiving element 35, which simultaneously forms the target element 41 and is attached to the load carriage 26. Therefore the angle of beam spread of the conical laser beam 38 is selected so that the receiving element 35 is still inside the conical laser beam 38 at the maximum possible deflection of the lifting mast 11 in normal operation, when the lifting mast 11 is in the highest possible raised position.

It is therefore always reliably guaranteed that a lifting height measurement can be taken even when the lifting mast 11 is bent.

The location of the receiving element 35 as a target element 41 on the lifting carriage 26 can also be used in the embodiment illustrated in FIG. 6, in which the laser 37 has a beam-expanding optical system, so that in place of the alignment element 40 the laser beam is expanded into a conical laser beam 38 as the expanded light beam 36.

It will be readily appreciated by those skilled in the art that modifications may be made to the invention without departing from the concepts disclosed in the foregoing description. Accordingly, the particular embodiments described in detail herein are illustrations only and are not limiting to the scope of the invention, which is to be given the full breadth of the appended claims and any and all equivalents thereof.

The invention claimed is:

1. An industrial truck comprising:
    a lifting mast;
    vertically movable load handling means located on the lifting mast; and
    a lifting height measurement system comprising a light emitter that emits a light beam, a receiving element, an optical alignment element, a target element, and a measurement path, the length of which measurement path varies with the lifting height, wherein at least one of the alignment element and the light emitter comprises a beam-forming optical system, so that at a maximum lifting height the target element is inside an expanded light beam of the light emitter for all positions of a maximum allowable bending of the lifting mast.

2. The industrial truck of claim 1, wherein the light emitter is a laser with a beam-expanding optical system.

3. The industrial truck of claim 1, wherein the light emitter is a semiconductor element comprising an LED.

4. The industrial truck of claim 1, wherein the beam forming optical system comprises a beam-expanding divergent lens.

5. The industrial truck of claim 1, wherein the beam-forming optical system forms an expanded light beam having a conical shape.

6. The industrial truck of claim 1, wherein the alignment element is simultaneously the light emitter.

7. The industrial truck of claim 1, wherein the target element is a reflecting target.

8. The industrial truck of claim 7, wherein in the measurement path the reflecting target is located opposite the light emitter or located opposite the receiving element on a part of the lifting mast or on the load handling means that move relative to the light emitter or relative to the receiving element during a lifting movement.

9. The industrial truck as recited in claim 8, wherein the light emitter is located on a lower part of the lifting mast or on the industrial truck, and the reflecting target is lifted with the moving part of the lifting mast or with the load handling means.

10. The industrial truck of claim 7, wherein the reflecting target has optical reflecting properties that differ from other areas of the lifting mast or of the load handling means illuminated by the expanded light beam.

11. The industrial truck of claim 7, wherein the reflecting target is a retroreflection surface.

12. The industrial truck of claim 7, wherein the reflecting target has a focusing shape.

13. The industrial truck of claim 1, further comprising a cleaning device for at least one of the optical system the receiving element.

14. The industrial truck of claim 1, wherein a surface of at least one of the beam-forming optical system and of the receiving element has a lotus effect.

15. The industrial truck of claim 14, wherein the surface is inclined with respect to horizontal.

16. The industrial truck of claim 1, wherein at least one of the beam-forming optical system and the receiving element and the target element are heated.

17. The industrial truck of claim 1, wherein a distance from a road surface is determined by means of an additional reference sensor comprising a laser distance sensor.

18. The industrial truck of claim 1, wherein a lifting height is input as a reference value by means of an input device.

19. The industrial truck of claim 1, wherein contact of the load handling means with the ground is detected by sensor means and is used to determine a reference value for the lifting height.

20. The industrial truck of claim 1, wherein the light emitter or the alignment element on the lifting mast is adjustable.

21. A method for the measurement of the lifting height of an industrial truck, comprising the steps of:
providing a light emitter, a receiving element, an optical alignment element, and a target element in operational arrangement with a lifting mast of the industrial truck, with a measurement path defined between the elements; and
expanding light emitted from the light emitter such that the target element remains in the expanded light beam for all positions of a maximum allowable bending of the lifting mast.

22. The method of claim 21, wherein for the verification of a value of the lifting height, a plausibility check is performed, in which a check is performed for at least one of unallowable values for the lifting height and for sudden variations in a rate of change of the lifting height and for parallelism of a lifting height change in response to a lifting height control signal within an allowable range of values.

23. The method of claim 21, wherein for a verification of the value of the lifting height, a plausibility check is performed, in which value ranges of the intensity of the signal received in the receiving element specified as a function of the lifting height, are compared with the measured lifting height.

24. The method of claim 21, wherein minimum values of the lifting height that occur over a specified measurement period are used a reference value zero for the lifting height.

25. The method of claim 21, wherein a variation in intensity of the signal received in the receiving element is monitored over time and when it falls below threshold values, is interpreted as a contamination of the lifting height measurement system.

26. The method of claim 25, wherein the threshold values are a function of the lifting height.

* * * * *

UNITED STATES PATENT AND TRADEMARK OFFICE
CERTIFICATE OF CORRECTION

| | | |
|---|---|---|
| PATENT NO. | : 8,763,759 B2 | Page 1 of 1 |
| APPLICATION NO. | : 13/554325 | |
| DATED | : July 1, 2014 | |
| INVENTOR(S) | : Volker Viereck et al. | |

It is certified that error appears in the above-identified patent and that said Letters Patent is hereby corrected as shown below:

In the Claims:

Column 11, Line 24, Claim 13, after "system" insert -- and --

Column 12, Line 31, Claim 24, delete "a" and insert -- as --

Signed and Sealed this
Seventh Day of October, 2014

Michelle K. Lee
*Deputy Director of the United States Patent and Trademark Office*